United States Patent
Benchemsi et al.

(10) Patent No.: US 10,129,485 B2
(45) Date of Patent: Nov. 13, 2018

(54) METHODS AND SYSTEMS FOR GENERATING HIGH DYNAMIC RANGE IMAGES

(71) Applicant: Microsoft Technology Licensing, LLC, Redmond, WA (US)

(72) Inventors: Karim Benchemsi, Lund (SE); Anders Stålring, Lund (SE); Anton Öhrn, Växjö (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/179,879

(22) Filed: Jun. 10, 2016

(65) Prior Publication Data

US 2017/0359498 A1    Dec. 14, 2017

(51) Int. Cl.
| | | |
|---|---|---|
| *H04N 5/235* | (2006.01) | |
| *G06T 5/00* | (2006.01) | |
| *G06T 5/40* | (2006.01) | |
| *G06T 5/50* | (2006.01) | |

(52) U.S. Cl.
CPC ............ *H04N 5/2355* (2013.01); *G06T 5/009* (2013.01); *G06T 5/40* (2013.01); *G06T 5/50* (2013.01); *H04N 5/2356* (2013.01); *G06T 2207/10144* (2013.01); *G06T 2207/20208* (2013.01); *G06T 2207/20221* (2013.01)

(58) Field of Classification Search
CPC .... H04N 5/2355; H04N 5/2356; G06T 5/009; G06T 5/50; G06T 5/40; G06T 2207/20221; G06T 2207/10144
See application file for complete search history.

(56) References Cited

U.S. PATENT DOCUMENTS

| | | |
|---|---|---|
| 6,850,642 B1 | 2/2005 | Wang |
| 7,636,098 B2 | 12/2009 | Yang et al. |
| 8,237,813 B2 | 8/2012 | Garten |
| 8,570,396 B2 | 10/2013 | Rapaport |
| 8,723,978 B2 | 5/2014 | Kwon et al. |
| 8,774,559 B2 | 7/2014 | Segall |
| 8,896,625 B2 | 11/2014 | Chen et al. |
| 8,947,555 B2 | 2/2015 | Velarde et al. |
| 9,087,382 B2 | 7/2015 | Zhai et al. |

(Continued)

FOREIGN PATENT DOCUMENTS

| | | |
|---|---|---|
| WO | 2010082692 A1 | 7/2010 |
| WO | 2014176994 A1 | 11/2014 |

OTHER PUBLICATIONS

Shen, et al., "Generalized Random Walks for Fusion of Multi-Exposure Images", In Journal of IEEE Transactions on Image Processing, vol. 20, Issue 12, Dec. 2011, pp. 3634-3646.

(Continued)

*Primary Examiner* — Mekonnen Dagnew

(57) ABSTRACT

An electronic device and a method for generating a high dynamic range (HDR) image frame. The method includes obtaining at least two digital image frames, where each of the at least two digital image frames is captured with a different exposure setting. The method includes generating, by a processor, a radiance map from the at least two digital image frames, and performing image fusion of the at least two digital image frames to generate a fused image. Further, the method includes combining, by the processor, color values of image channels of the fused image and the radiance map to generate the HDR image frame.

20 Claims, 8 Drawing Sheets

(56) References Cited

U.S. PATENT DOCUMENTS

| | | |
|---|---|---|
| 9,172,934 B2 | 10/2015 | Lin et al. |
| 2004/0218830 A1* | 11/2004 | Kang ........................ G06T 5/50 382/274 |
| 2005/0073529 A1* | 4/2005 | Gu ........................ G06K 9/2081 345/589 |
| 2008/0143844 A1 | 6/2008 | Innocent |
| 2010/0103194 A1* | 4/2010 | Chen ........................ G06T 5/50 345/629 |
| 2012/0262600 A1* | 10/2012 | Velarde ................ H04N 5/2355 348/223.1 |
| 2013/0322753 A1 | 12/2013 | Lim et al. |
| 2015/0063694 A1 | 3/2015 | Shroff et al. |
| 2015/0078661 A1 | 3/2015 | Granados et al. |

OTHER PUBLICATIONS

Kao, Wen-Chung, "High Dynamic Range Imaging by Fusing Multiple Raw Images and Tone Reproduction", In Proceedings of IEEE Transactions on Consumer Electronics, vol. 54, Issue 1, Feb. 2008, pp. 10-15.

Raskar, et al., "Image Fusion for Context Enhancement and Video Surrealism", In Proceedings of ACM SIGGRAPH, Jul. 31, 2005, pp. 85-93.

Niegraszus, et. al., "Radiance Map", http://cybertron.cg.tu-berlin.de/pdci09/hdr_tonemapping/radiancemap.html. 2009, 5 pages.

"International Search Report and Written Opinion Issued in PCT Application No. PCT/US2017/035567", dated Aug. 11, 2017, 16 Pages.

* cited by examiner

METHODS AND SYSTEMS FOR GENERATING HIGH DYNAMIC RANGE IMAGES

TECHNICAL FIELD

The present application generally relates to image capture and processing and, more particularly, to methods and systems for generating High Dynamic Range (HDR) images.

BACKGROUND

In addition to image capturing devices such as digital cameras, many electronic devices such as mobile phones, tablets, notebook, smart watches, etc., are also equipped with image capturing capabilities, and such devices are extensively used in day to day life by the users. Many of such devices are further equipped with features of capturing HDR images of a scene containing HDR for example, a combination of shadow/dark and well-lit/bright areas. An HDR image has a greater dynamic range as compared to standard images, as it includes rich details of both the shadows and the bright areas of the scene in a single image. The dynamic range is a ratio of maximum and minimum measurable light levels (i.e. intensities) present in the images.

One of the widely followed HDR capture techniques includes capturing multiple standard dynamic range (SDR) images at different exposure levels. Thereafter, the captured SDR images are merged to one image to produce HDR in the merged image. In use cases, some scenes may have different lights, for example, in a scene containing indoor lighting with a candle and a window with sunshine, yellow light pattern maybe present inside the room and a blue light pattern maybe present outside the window. In such scenarios, a single white balance would be inappropriate for all regions in the HDR image. If a global white balance is used for the HDR image, it may lead to unnatural colors in some regions of the HDR image. Some existing solutions use image fusion to generate both the intensity map and the color map. However, this also generates artifacts in the form of halos in regions with large intensity differences in the scene.

The embodiments described below are not limited to implementations, which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, a method for generating an HDR image frame is presented. The method includes obtaining at least two digital image frames, where each of the at least two digital image frames is captured with a different exposure setting. The method includes generating, by a processor, a radiance map from the at least two digital image frames, and performing image fusion of the at least two digital image frames to generate a fused image. Further, the method includes combining, by the processor, color values of image channels of the fused image and the radiance map to generate an HDR image frame.

In an embodiment, an electronic device for generating an HDR image frame is presented. The electronic device includes a memory including computer program code for image processing and a processor. The processor is configured to execute the computer program code to cause the electronic device to obtain at least two digital image frames, where each of the at least two digital image frames is captured with a different exposure setting. The electronic device is caused to generate a radiance map from the at least two digital images frames, and to perform image fusion of the at least two digital image frames to generate a fused image. Further, the electronic device is caused to combine color values of image channels of the fused image and the radiance map to generate an HDR image frame.

In an embodiment, a computer program product includes at least one computer-readable storage medium. The computer-readable storage medium includes a set of instructions, which, when executed by one or more processors, cause an electronic device to obtain at least two digital image frames, where each of the at least two digital image frames is captured with a different exposure setting. The electronic device is caused to generate a radiance map from the at least two digital image frames, and to perform image fusion of the at least two digital image frames to generate a fused image. Further, the electronic device is caused to combine color values of image channels of the fused image and the radiance map to generate an HDR image frame.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the following accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Various example embodiments of the present disclosure provide generation of HDR image frames by electronic devices. These embodiments take input in form of image frames captured at different exposure settings, and separately generate a radiance map, and color information for pixels for an HDR image frame. The color information for the pixels for the HDR image frame is determined by generating a fused image by performing image fusion of the input image frames using a selection map for constructing weights for the image fusion. Various example embodiments determine the selection map by taking best regions from each input image frame. Further, various example embodiments adjust relative intensities of color values (obtained in the color information) in the fused image using the radiance map to generate the HDR image frame. While retaining the colors from the fused image, intensity part of the colors is obtained from the radiance map, and the colors of the fused image are scaled based on the intensities in the radiance map to generate the HDR image frame. As the fused image is constructed from fusing different image frames captured at appropriate exposure settings based on the selection map, the fused image comprises a set of individual regions that are locally white balanced. For instance, the colors are handled locally (e.g., region wise) using the image fusion, weights for white balancing also change locally, and the image frames are inherently fused with appropriate local white balances. Further, the intensity part of the colors is directly mapped to the radiance map, so the overall process precludes formation of intensity halos in the HDR image frame.

Various example embodiments of generation of HDR image frames in electronic devices are explained with reference to FIGS. 1 to 8. Certain examples of images and schematic diagrams are used only for example purposes for facilitating the description of some example embodiments, and as such, these examples should not be considered as limiting to the scope of the present disclosure.

The terms 'digital image', 'image' 'digital image frame' and 'image frame' are used interchangeably throughout the description, and these terms refer to any single image/image frame capture of a scene, or one image/image frame of a successive or burst capture of the scene, or a single frame of the scene while capturing a video of the scene. For instance, one image frame during a video capture may be considered a single standalone image. Similarly, the terms 'HDR image' and 'HDR image frame' are same and they also used interchangeably throughout the description.

Figure 1:
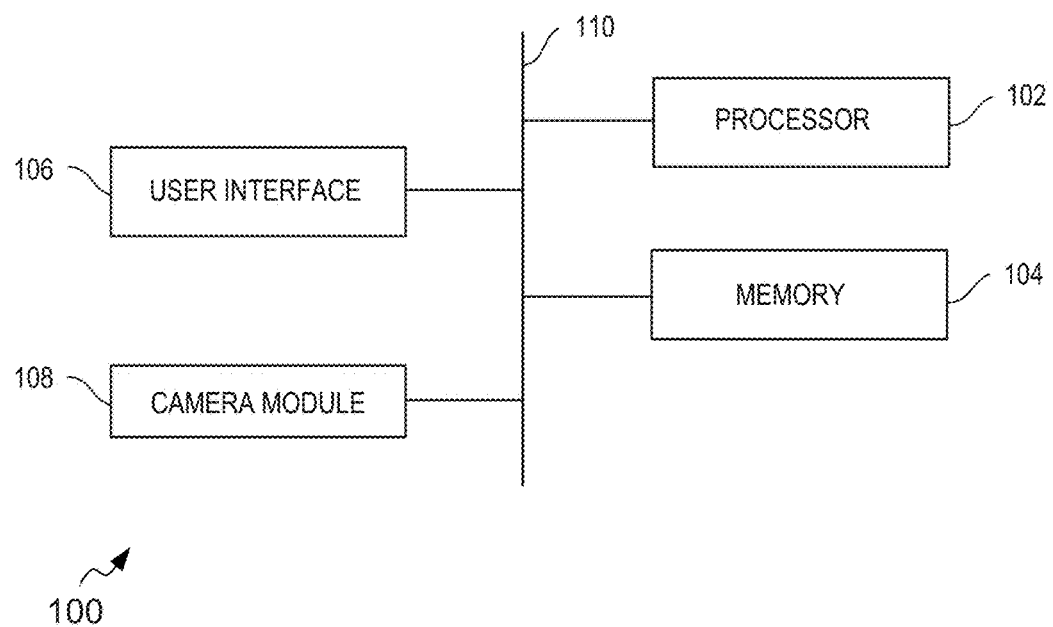
FIG. 1 illustrates a schematic block diagram representation of an electronic device for generating HDR image frames.

FIG. 1 is a block diagram showing an electronic device 100, in accordance with an example embodiment. The electronic device 100 as illustrated and hereinafter described is merely illustrative of an electronic device that could benefit from embodiments of the disclosure and, therefore, should not be taken to limit the scope of the disclosure. The electronic device 100 may be an image capture device such as a digital camera, or any electronic device comprising image capturing or processing capabilities such as including, but not limited to, a mobile phone, a laptop computer, a tablet computer and a video recorder. It is noted that the electronic device 100 may include fewer or more components than those depicted in FIG. 1. Moreover, the electronic device 100 may be implemented as a centralized device, or, alternatively, various components of the electronic device 100 may be deployed in a distributed manner while being operatively coupled to each other. In an embodiment, one or more components of the electronic device 100 may be implemented as a set of software layers on top of existing hardware systems.

The electronic device 100 includes a processor for example, a processor 102, and at least one memory for example, a memory 104. The memory 104 is capable of storing machine executable instructions. Further, the processor 102 is capable of executing the stored machine executable instructions. The processor 102 may be embodied in a number of different ways. In an embodiment, the processor 102 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In at least one example embodiment, the processor 102 utilizes computer program code to cause the electronic device 100 to perform one or more actions, for example, capturing at least two digital image frames at different exposure settings and processing the digital image frames for generating the HDR image.

The memory 104 may be embodied as one or more volatile memory devices, one or more non-volatile memory devices, and/or a combination of one or more volatile memory devices and non-volatile memory devices. For example, the memory 104 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

In at least one example embodiment, the electronic device 100 includes a user interface 106 (also referred to as UI 106) for providing an output and/or receiving an input. The user interface 106 is configured to be in communication with the processor 102 and the memory 104. Examples of the user interface 106 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal display, active-matrix organic light-emitting diode (AMOLED) display, a microphone, a speaker, ringers, vibrators, and the like. In an example embodiment, the processor 102 may include user interface circuitry configured to control at least some functions of one or more elements of the user interface 106, such as, for example, a speaker, a ringer, a microphone, a display, and/or the like. The processor 102 and/or the user interface circuitry may be configured to control one or more functions of the one or more elements of the user interface 106 through computer program instructions, for example, software and/or firmware, stored in a memory, for example, the memory 104, and/or the like, accessible to the processor 102.

The electronic device 100 includes a camera module 108, for example including one or more digital cameras. The camera module 108 is configured to be in communication with the processor 102 and/or other components of the electronic device 100 to capture digital image frames, videos and/or other graphic media. The camera module 108 may include hardware and/or software necessary for creating a digital image frame from a captured image, or facilitating a viewfinder image frame of a scene in front of the camera module 108. For example, the camera module 108 may include hardware, such as a lens and/or other optical component(s) such as one or more image sensors. Examples of one or more image sensors may include, but are not limited to, a complementary metal-oxide semiconductor (CMOS) image sensor, a charge-coupled device (CCD) image sensor, a backside illumination sensor (BSI) and the like. Alternatively, the camera module 108 may include only the hardware for viewing a digital image frame, while a memory device of the electronic device 100 stores instructions for execution by the processor 102 in the form of software for creating a digital image frame from a captured image. In an example embodiment, the camera module 108 may further include a processing element such as a co-processor that assists the processor 102 in processing image frame data and an encoder and/or decoder for compressing and/or decompressing image frame data. The encoder and/or decoder may encode and/or decode according to a standard format, for example, a Joint Photographic Experts Group (JPEG) standard format.

In an example embodiment, the camera module 108 is configured to capture image with various exposure settings. The exposure settings may be provided to a user capturing the images by accessing the UI 106, where the exposure settings may be selectable on a slider scale, or may be inputted in form of values or in drop down options. Once an exposure setting is selected, the camera module 108 is configured to capture the scene using the selected exposure setting. In some example embodiments, the camera module 108 is configured to capture successive images of the scene with varying exposure settings automatically, for example, capturing five successive images using five different bracketed exposure settings in increasing, decreasing or in random orders.

The various components of the electronic device 100, such as components (102-108) may communicate with each other via a centralized circuit system 110 to generate HDR image in the electronic device 100. The centralized circuit system 110 may be various devices configured to, among other things, provide or enable communication between the components (102-108) of the electronic device 100. In certain embodiments, the centralized circuit system 110 may be a central printed circuit board (PCB) such as a motherboard, a main board, a system board, or a logic board. The centralized circuit system 110 may also, or alternatively, include other printed circuit assemblies (PCAs) or communication channel media.

In at least one embodiment, the memory 104 is configured to store computer program code for generating HDR image. The computer program code comprises instructions for capturing at least two digital image frames, where each digital image frame is captured using a different exposure setting. Further, the computer program code also includes instructions for processing the at least two digital image frames to generate an HDR image.

The processor 102 is configured along with the content of the memory 102 to cause the electronic device 100 to obtain at least two digital image frames (for example, I1, I2 and I3), where each of the images I1, I2 and I3 is captured at a different (e.g., unique) exposure setting. In an example embodiment, for obtaining the images I1, I2 and I3, the processor 102 is configured to along with the content of the memory 104 to cause the camera module 108 to capture the images I1, I2 and I3, where the camera module 108 adjusts to the unique exposure setting for capturing each of the images I1, I2 and I3. In another example embodiment, the images I1, I2 and I3 may be prerecorded or stored in the electronic device 100. In yet another example embodiment, the images I1, I2 and I3 may be received from sources external to the electronic device 100. Examples of the external sources non-exhaustively include external storage medium such as DVD, Compact Disk (CD), flash drive, memory card, or external storage locations accessible through the Internet, LAN, WAN, Bluetooth, and the like. Various example embodiments are herein explained with three images I1, I2 and I3 as example of the at least two digital image frames, however, the at least two digital image frames can have any number of image frames that is greater than two, with the primary requirement of all digital image frames having been captured with different exposure settings.

In an example embodiment, the electronic device 100 is caused to align the at least two digital image frames (images I1, I2 and I3). The electronic device 100 is caused to align the images I1, I2 and I3 using any suitable technique such as image registration (e.g., finding corresponding pixel points in the images I1, I2 and I3) and applying suitable transformations. Some other techniques such as mean threshold bitmaps (e.g., a feature detector invariant to differences in exposure values) may also be used to align the images I1, I2 and I3. For the purposes of the present description, the aligned images are also referred to as images I1, I2 and I3. In some example scenarios, the images I1, I2 and I3 may already be aligned images, and in such cases the alignment of the images I1, I2 and I3 maybe skipped in the electronic device 100.

The electronic device 100 is caused to generate a radiance map from the at least two images frames (images I1, I2 and I3). In an example embodiment, for generating the radiance map, the electronic device 100 is caused to map the intensities of the images I1, I2 and I3 using histograms of the images I1, I2 and I3 for each color channel, for example Red (R), Green (G) and Blue (B) image channels.

The electronic device 100 is caused to generate histograms corresponding to all image channels of the images I1, I2 and I3. For example, histograms are generated for each of RGB image channels of each of the images I1, I2 and I3. Further, the electronic device 100 is caused to perform mapping of pixel values to intensities of the scene using the histograms. The electronic device 100 is further caused to use the reliable pixels within some intensity thresholds from the images I1, I2 and I3 to construct the radiance map. Herein, the intensity thresholds may be one or more dark thresholds and white thresholds, for excluding the extra dark or extra white pixels from the histograms that may not be reliable for the mapping.

The electronic device 100 is caused to determine the relative intensities of pixels for a target HDR image (i.e. the final HDR image) based on selecting reliable pixel intensities from the images I1, I2 and I3. For instance, in an example embodiment, a relative intensity for a pixel Pi is mapped from the best available intensity from the images I1, I2 and I3. In another example embodiment, a relative intensity for the pixel Pi may be mapped to an average of the intensities for the pixel Pi in each of the images I1, I2 and I3, if the intensities for the pixel Pi are reliable in each of the images I1, I2 and I3.

In an example embodiment, the electronic device 100 is caused to merge the relative intensities of the pixels to achieve a smooth transition. In a non-limiting example, the intensity values are merged using pyramids, and borders of different regions (where there are sharp changes in the relative intensities) are softened to balance the intensity gradient so as to make smooth transition at the borders.

In an example embodiment, after merging the intensities using pyramids, the electronic device 100 is caused to map the intensities to a global range. For instance, in an example, the pixel intensities lying in the range of 0 to 255 may be mapped to a global range say 0 to 1. In this example, intensity 0 may be mapped to 0 in the global range and intensity 255 in the darkest image (e.g., image I1) may be mapped to 1, and all intermediate intensity values lying between 0 to 255 are correspondingly mapped between 0 to 1. Accordingly, the radiance map of the intensities is generated. In another example embodiment, the intensities are first mapped to global range, and thereafter the mapped intensities are merged using pyramids to generate the radiance map. Hence, the radiance map will include intensities for the pixels of the target HDR image frame, and the intensities for the pixels are used along with color values obtained from a fused image (described later) for generating the HDR image.

The electronic device 100 is caused to generate a fused image using image fusion of the at least two digital image frames (images I1, I2 and I3). The fused image is generated to capture the color information of pixels for the HDR image. In an example embodiment, the electronic device 100 is caused to perform image fusion of the images I1, I2 and I3 using a selection map to generate binary weights for the fusion of the images I1, I2 and I3.

In an example embodiment, the electronic device 100 is caused to create the selection map for the images I1, I2 and I3 such that the selection map is representative of which image out of images I1, I2 and I3 should be used for each region of the HDR image. In an example embodiment, the selection map may include mapping at pixel level of the images I1, I2 and I3. In another embodiment, the selection map includes mapping at region wise in the image I1, I2 and I3. It would be appreciated that fusing the image I1, I2 and I3 according to the selection map enables optimization of the dynamic range that can be represented, and such fusion process avoids introducing ghosting due to moving objects between images I1, I2 and I3.

In an example embodiment, for a given region (Rn) in the images I1, I2 and I3, the selection map suggests at least one image from among the images I1, I2 and I3 that should be used for constructing the corresponding region (R'n) in the HDR image. For instance, in a scenario, a pixel (Pi) in the region (Rn) corresponds to a candle light, and the pixel Pi has better detail in the image I1 as compared to in the images I2 and I3, due to the fact that the image I1 is captured using smaller exposure setting as compared to exposure settings for capturing the images I2 and I3. In this scenario, the given pixel (Pi) can be taken from the image I1 in the selection map. Similarly, the pixels belonging to the dark regions can be taken from the image I2 captured with higher exposure setting, and pixels belonging to the average lighting regions may be taken from the image I3 captured using normal exposure setting. Herein, it is assumed that the normal exposure setting has an amount of exposure between the amounts of exposure used for capturing the image I1 and I2.

In one non-limiting example representation, it is assumed that there are N source digital image frames obtained for generating the HDR image. In a representation, 'S' is a label for each pixel in form of an image from among the N source image frames, for example, label for a pixel 'p' is 'Sp', where Sp={0, 1, . . . N). In an example embodiment, for generating the selection map, a total penalty function is minimized, where the total penalty function E(S) can be represented using the following equations (1) and (2):

$$E(S) = \alpha \cdot \Sigma_p D(I_p, S_p) + \gamma \cdot \Sigma_{p,q \in N_p} V(S_p, S_q, G_p) \quad (1)$$

$$V(S_p, S_q, G_p) = (1 - \delta_{S_p, S_q}) * (1 + \beta(G_p + G_q)) \quad (2)$$

In the above equations (1) and (2), function $V(S_p, S_q, G_p)$ can be described as cost of changing labels between a pixel 'p' and a neighboring pixel 'q' of the pixel 'p', and '$I_p$' is the intensity of the pixel 'p' in image captured using EV0 exposure (normal exposure) and it ranges between 0 to 255. $N_p$ is the pixel neighborhood of the pixel 'p'. Further, 'G' represents a ghostmap that includes a probability of presence of a moving object at pixel 'p' (e.g., '$G_p$') and at pixel 'q' (e.g., '$G_q$') in an image. Each of the '$G_p$' and '$G_q$' may be in the range of [0,1], where 0 represent zero percent probability of presence of a moving object and 1 represents 100 percent probability of presence of the moving object. Further, '$\delta$' is a kronecker delta, and '$\alpha$', '$\beta$' and '$\gamma$' are constants that may be adjusted based on the scene and the camera elements. In the equation (1), $D(I_p, S_p)$ is a function that is high if the pixel value is not in the range that can be considered for a reliable selection. For instance, if the pixel value ($I_p$) is low, the $D(I_p, S_p)$ will be low for the brighter image but will be high for the darker image.

In another example embodiment, the selection map may represent a selection mask comprising binary values, for example n-bit binary values corresponding to each pixel of the HDR image. In this example embodiment, three input images I1, I2 and I3 can be represented by 2-bit binary codes '00', '01' and '10', respectively, and the selection mask may be formed by assigning each pixel with one of the binary codes '00', '01' and '10'. Accordingly, if the pixel is assigned with '00', the pixel should be taken from the image I1 for image fusion. Similarly, if the pixel is assigned with '01', the pixel should be taken from the image I2 for the image fusion. Hence, the n-bit binary values can be used for generating the selection map for each pixel to be used for generating the fused image.

In an example embodiment, the electronic device 100 is caused to perform image fusion of the at least two image frames (Images I1 to I3) using a suitable technique such as Laplacian pyramid representation. It other alternate implementations, high pass filtering technique, uniform rational filter bank, discrete wavelet transform may also be used for the image fusion of the images I1 to I3 based on the selection map.

In some example embodiment, intensities of the radiance map may be tone mapped using suitable tone mapping techniques so that the HDR image can be displayed properly on target display devices. However, if the display devices are capable of displaying the full dynamic range of the HDR image, the tone mapping process may be skipped.

In an example embodiment, once the fused image and the radiance map are obtained, the electronic device 100 is caused to scale the colors of the fused image based on the intensities in the radiance map to create the HDR image.

In an example representation, RGB color values of the fused image are scaled as per the following equation (3):

$$C = \frac{C_{fused} * I_{tonemapped}}{\text{sum}(R_{fused}, G_{fused}, B_{fused})}, \quad (3)$$

where $C = \{R, G, B\}$.

Hence, various example embodiments provide generation of the colors of the HDR image from the fused image generated by the image fusion, and the colors of the fused image are further scaled to intensity from the radiance map to produce the final colors of the HDR image, thereby reducing intensity halos. As the colors are handled locally using the image fusion and the intensity part is directly mapped from the radiance map, the HDR image is HDR mixed with local white balances and without intensity halos.

Figure 2:
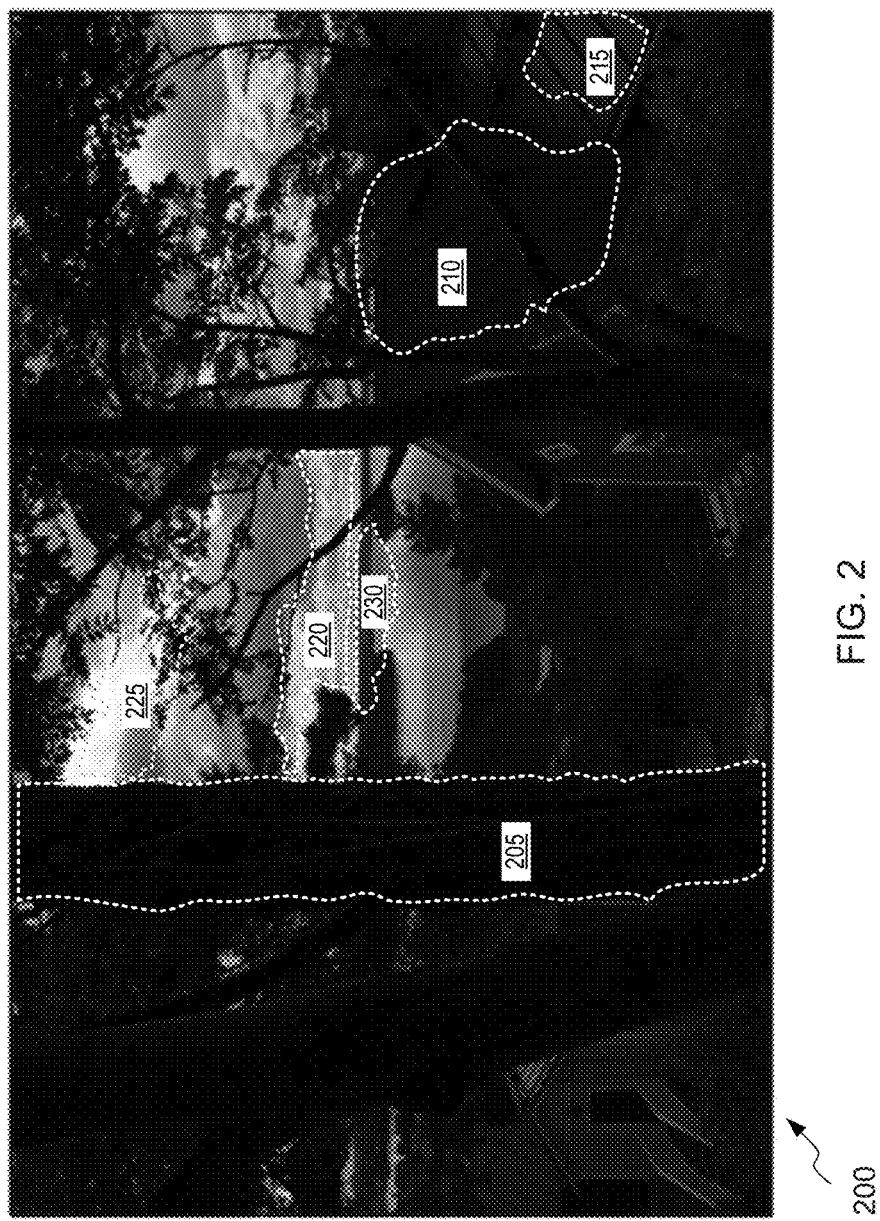
FIGS. 2, 3 and 4 illustrate examples of images of a scene captured with low, high and normal exposure settings, respectively.
Figure 3:
Figure 4:
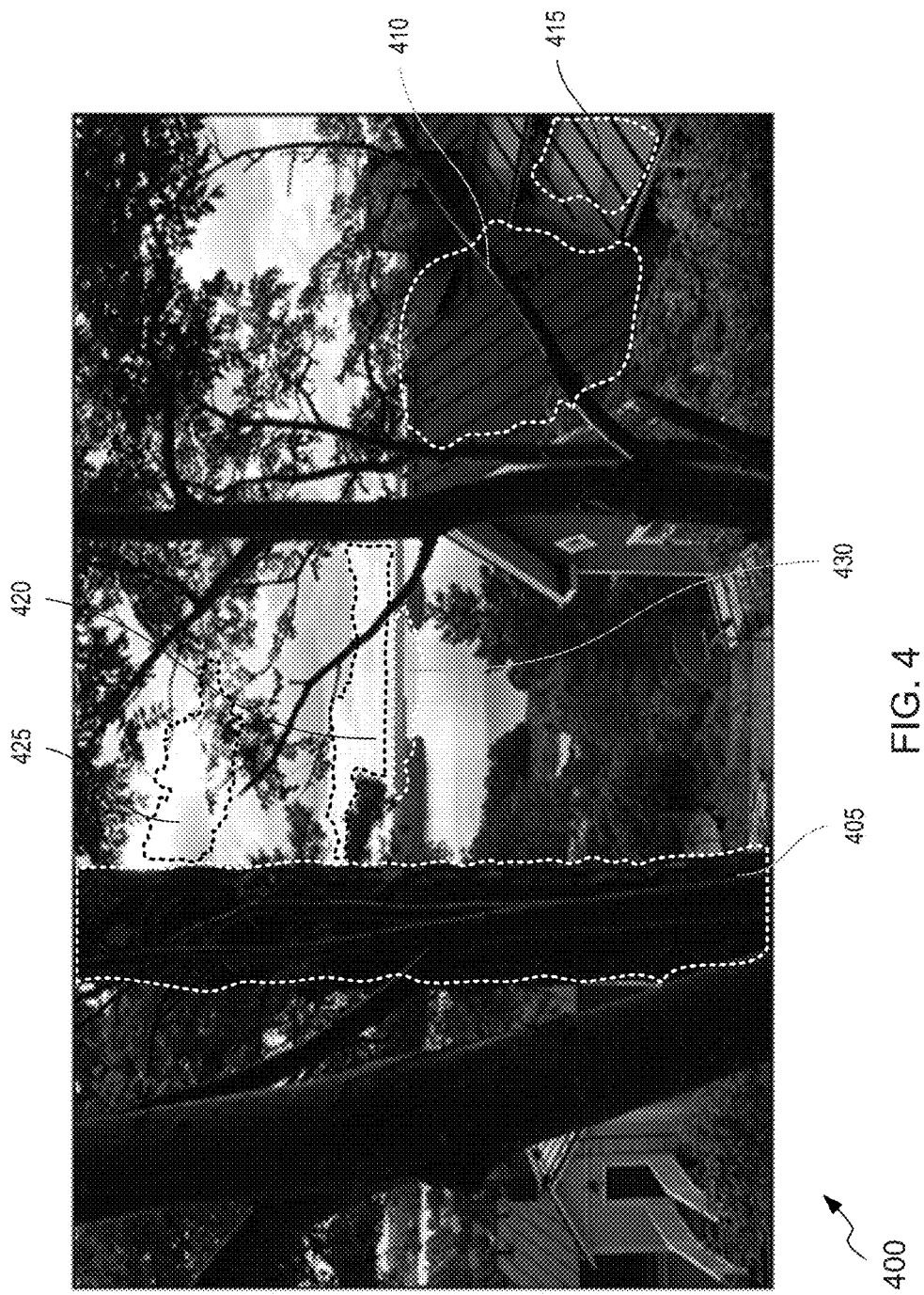

Referring now to FIGS. 2, 3 and 4, example illustrations of three images are shown that are captured with different exposure settings. The exposure settings may be considered as various combinations of one or more of shutter speed, lens aperture setting, and ISO settings of the camera elements used for the image capture. On a general note, a higher exposure setting allows more light into the camera during the exposure, and a lower exposure reduces the amount of light allowed into the camera during the exposure. Hence, the same object of the scene, if captured with different exposure settings, is imaged with different sharpness (details) for example, too bright, too dark or anything between too bright and too dark. For making features in the dark regions of the scene visible, majority of the cameras may need longer exposure time, however it also results into saturation of the bright areas of the scene. Similarly, bright areas may be captured with shorter exposure time, but it also compromise features in the darker areas of the scene. Hence, embodiments of the present disclosure offer multiple image capture of the scene by varying exposure settings such that each captured image captures at least one facet of the dynamic range of the scene. Accordingly, when the multiple captured images are fused using image fusion, a greater dynamic range of the scene is covered in the fused image.

In a non-limiting example, the exposure settings may be bracketed exposure settings such as 3EV−, 2EV−, 1EV−, EV0, 1EV+, 2EV+ and 3EV+, where "EV" denotes an exposure setting and refers to a combination of one or more of shutter speed, aperture setting and ISO of camera elements. Negative bracketed exposures for example, 3EV−, 2EV−, 1EV−, represent smaller exposure values as compared to positive bracket exposures 1EV+, 2EV+ and 3EV+, with 3EV− being the smallest amount of exposure and 3EV+ being the largest amount of exposure. Herein, exposure setting EV0 refers to a normal amount of exposure as determined by camera's auto-exposure (AE) algorithm while capturing an image/image frame.

FIG. 2 illustrates an image 200 captured with a low exposure setting for example, 2EV−. In the example representation of FIG. 2, as the image 200 is captured in the low exposure setting (2EV−), darker areas of the scene (e.g., shadow areas) are produced black with no (or very little) details, and at the same time brighter areas such as clouds in the sky are produced with proper details. For instance, in the illustrated FIG. 2, a tree portion such as a portion 205 and roof portions 210, 215 are produced as dark (underexposed), and highlighted portion of the sky for example, clouds portions 220 and 225 seem to have proper details. Further, a portion 230 close to a water body located at a greater depth is also produced with very little details (or not correctly exposed).

FIG. 3 illustrates an image 300 captured with higher exposure settings for example, 2EV+. In the example representation of FIG. 3, as the image 300 is captured with high exposure settings (2EV+), the darker areas of the scene (e.g., shadow areas) are produced with proper details, and at the same time brighter areas such as clouds in the sky are produced as white (or overexposed). For instance, in the illustrated FIG. 3, a tree portion such as a portion 305 and roof portions 310, 315 are produced with proper details (correctly exposed), and highlighted portion of the sky for example, clouds portions 320 and 325 seem to be overexposed and appear white. Further, a portion 330 close to the waterbody located at a greater depth is also relatively overexposed to white as compared to its real appearance.

FIG. 4 illustrates an image 400 captured with normal exposure setting for example, EV0. The image 400 captured in the normal exposure (EV0) tends to have details as per the lighting condition of the scene. It is noted that the image 400 may not have a complete black or white regions as present in the images 200 or 300, but some individual regions may be captured with less details as compared to corresponding individual details in the images 200 and 300. For instance, portions 405 and 410 in the image 400 are captured with better details as compared to corresponding portion 205 and 210 in the image 200, but with lesser details as compared to corresponding portion 305 and 310 in the image 300. However, the portion 415 seem to have better details (close to real world appearance of roof portion) as compared to corresponding portion 315 in the image 300. Similarly, cloud portions 420 and 25 in the image 400 are captured with better details as compared to corresponding white portions 315 and 320 in the image 300, but with lesser details as compared to corresponding cloud portion 215 and 220 in the image 200. However, a portion 430 close to the waterbody located at a greater depth seem to have better details (close to real world appearance) as compared to corresponding portion 230 in the image 200.

Figure 5:
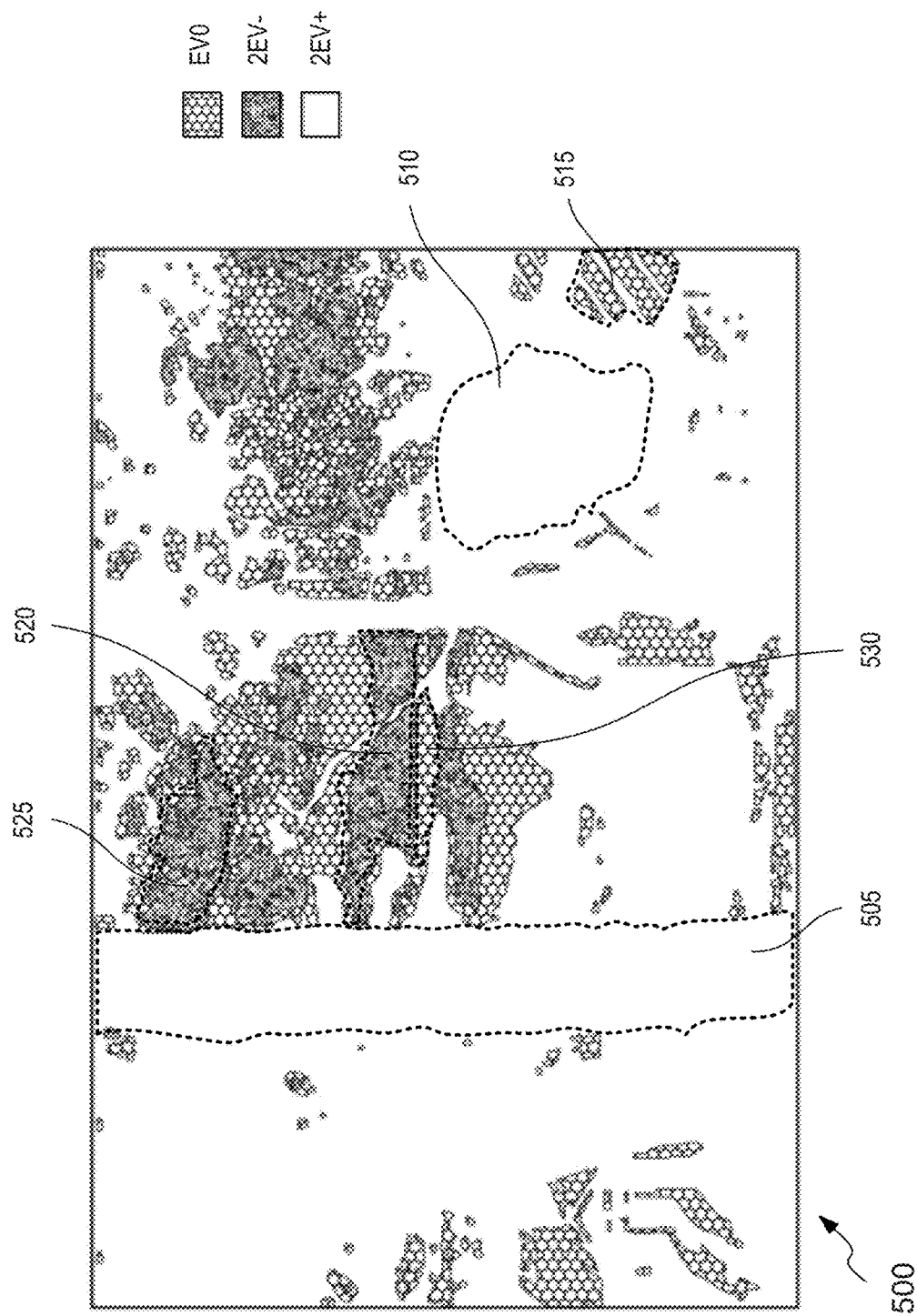
FIG. 5 illustrates an example representation of an image corresponding to a selection map, in accordance with an example embodiment.

FIG. 5 illustrates an example representation of an image 500 corresponding to a selection map, in accordance with an example embodiment. As explained with reference to FIG. 1, the selection map represents a map used for performing image fusion of regions of images from at least two digital image frames (e.g., images 200, 300 and 400) to generate a single fused image (e.g., see image 600 in FIG. 6) based on a region selection rule for each region of the images 200, 300 and 400.

In the illustrated example of FIG. 5, three different types of shades are used for different regions so as to represent the most reliable source image for the respective regions. For instance, unshaded regions (see, 505 and 510) represent that such regions have the most reliable details in the image captured with larger exposure setting (2EV+) i.e. the image 300. Further, the shaded regions such as regions 520 and 525 represent that such regions have the most reliable details in the image captured with smallest exposure setting (2EV−) i.e. the image 200. Furthermore, the shaded regions such as regions 515 and 530 represent that such regions have the most reliable details in the image captured with normal exposure setting i.e. the image 400. It should be noted that only few regions are referenced herein for the sake the brevity of the description, and that the selection map covers the entire regions of the scene so as to generate the fused image for the complete scene.

Figure 6:
FIG. 6 illustrates an example representation of a fused image obtained by image fusion of images shown in FIGS. 2, 3 and 4 using the selection map shown in FIG. 5, in accordance with an example embodiment.

FIG. 6 illustrates an example representation of a fused image 600 obtained by fusing the images 200, 300 and 400 using the selection map (see, the image 500), in accordance with an example embodiment. As explained with reference to FIG. 1, the fused image 600 is obtained by performing image fusion of the digital image frames, for example, the images 200, 300 and 400. In an example embodiment, the selection map (e.g., the image 500) is used as binary weights while performing the image fusion process of the images 200, 300 and 400. In the fused images 600, only few regions are represented for the brevity of the description. For example, the regions 605 and 610 are fused from the corresponding regions 305 and 310 of the image 300, the regions 615 and 630 are fused from the corresponding regions 415 and 430 of the image 400 and the regions 620 and 625 are fused from corresponding regions 220 and 225 of the image 200.

In an example embodiment, color values of the pixels of the fused image 600 are scaled based on corresponding absolute intensities in the radiance map to generate the HDR image.

Figure 7:
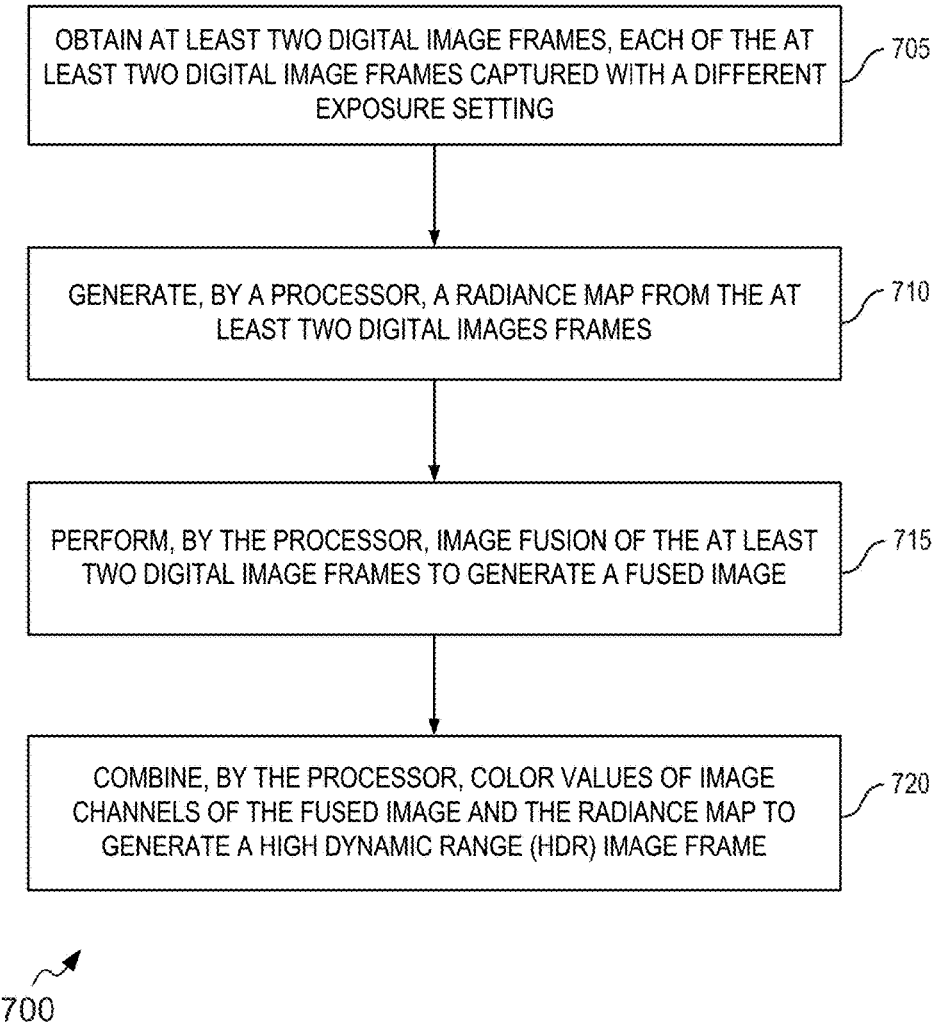
FIG. 7 illustrates an example flow diagram of a method for generating HDR images, in accordance with an example embodiment.

FIG. 7 illustrates a flow diagram of a method 700 of generation of HDR image frames, by an electronic device, such as the electronic device 100, in accordance with an example embodiment of the present disclosure. It should be noted that to facilitate discussions of the flowcharts of FIG. 7, certain operations are described herein as constituting distinct operations performed in a certain order. Such implementations are examples only and non-limiting in scope. Certain operations may be grouped together and performed in a single operation, and certain operations may be performed in an order that differs from the order employed in the examples set forth herein. Moreover, certain operations of the method 700 are performed in an automated fashion. These operations involve substantially no interaction with the user. Other operations of the method 700 may be performed by in a manual fashion or semi-automatic fashion. These operations involve interaction with the user via one or more user interface presentations.

At 705, the method 700 includes obtaining at least two digital image frames where each of the at least two image frames is captured with a different exposure setting. For instance, three digital image frames (images I1, I2 and I3) may be captured with different exposure settings, for example 1EV−, EV0 and 1EV+. Herein, multiple exposure settings are used because of the fact that by taking multiple images (or image frames) of a scene with different amounts of exposure, each region of the scene may be properly exposed in at least one image of the multiple captured images.

In some scenarios, the captured images I1, I2 and I3 may not be properly aligned due to handshake or due to any other reason. In such cases, the method 700 includes aligning the images I1, I2 and I3 using known techniques such as image registration and transformation techniques. For the purposes of the present description, the aligned images are also referred to as images I1, I2 and I3.

At 710, the method 700 includes generating a radiance map from the at least two digital image frames (images I1, I2 and I3). In an embodiment, the operation 710 may be performed by mapping intensities of the images I1, I2 and I3 so that the histograms of the images I1, I2 and I3 are as similar as possible. In an example, the process of histogram mapping is done in the RGB space. For example, a histogram map is created for each image channel (R, G and B) of the images I1, I2 and I3, Thereafter, the intensities of the each image channel (R, G and B) of the histograms of images I1, I2 and I3 are mapped such that the histograms of images I1, I2 and I3 look similar. The method 700 includes creating a map for each pixel for intensity correspondences within the images I1, I2 and I3. More specifically, the method 700 includes determining relative intensity of each pixel (Pi) for a target HDR image based on selecting a reliable pixel intensity for the pixel (Pi) from the images I1, I2 and I3. In some embodiments, the reliable pixel intensity may be an average of two or more reliable pixel intensities for the pixel (Pi) in the images I1, I2 and I3.

In an example embodiment, for performing the operation 710, method 700 further includes merging the relative intensities of the pixels using pyramids to achieve smooth transition of intensity across regions in the target HDR image (i.e. the final HDR image). Hence, intensities of the pixels are constructed for the radiance map based on the merging process. In an example embodiment, the intensities are mapped to the global range of the target HDR image before they are merged, and the intensity map generated thereafter is termed as the radiance map. In another example embodiment, after the intensities are merged using pyramids, the merged intensities can be scaled to the global range to generate the radiance map.

At 715, the method 700 includes performing image fusion of the at least two digital image frames (images I1, I2 and I3) to generate a fused image. As explained with reference to FIGS. 1 and 5, the fused image is generated using a selection map so as to keep the most reliable regions of each of the images I1, I2 and I3 in the fused image. The fused image is generated for the color information for the HDR image.

At 720, the method 700 includes combining pixel values of image channels (e.g., RGB values) from the fused image and the radiance map to produce the HDR image frame. In one example, combining the RGB values of the fused image with the radiance map includes scaling the RGB values of the pixels based on the pixel intensities determined in the radiance map. For instance, if the RGB values for a pixel Pi is 3, 2 and 4 respectively, and the pixel intensity of the pixel Pi in the radiance map is 100, the final RGB values for the pixel Pi in the HDR image is 30, 40 and 20, respectively.

One or more example embodiments of method of generating HDR image frames in electronic devices are described herein with references to FIG. 7. The disclosed method 700 can be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer or image processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 8:
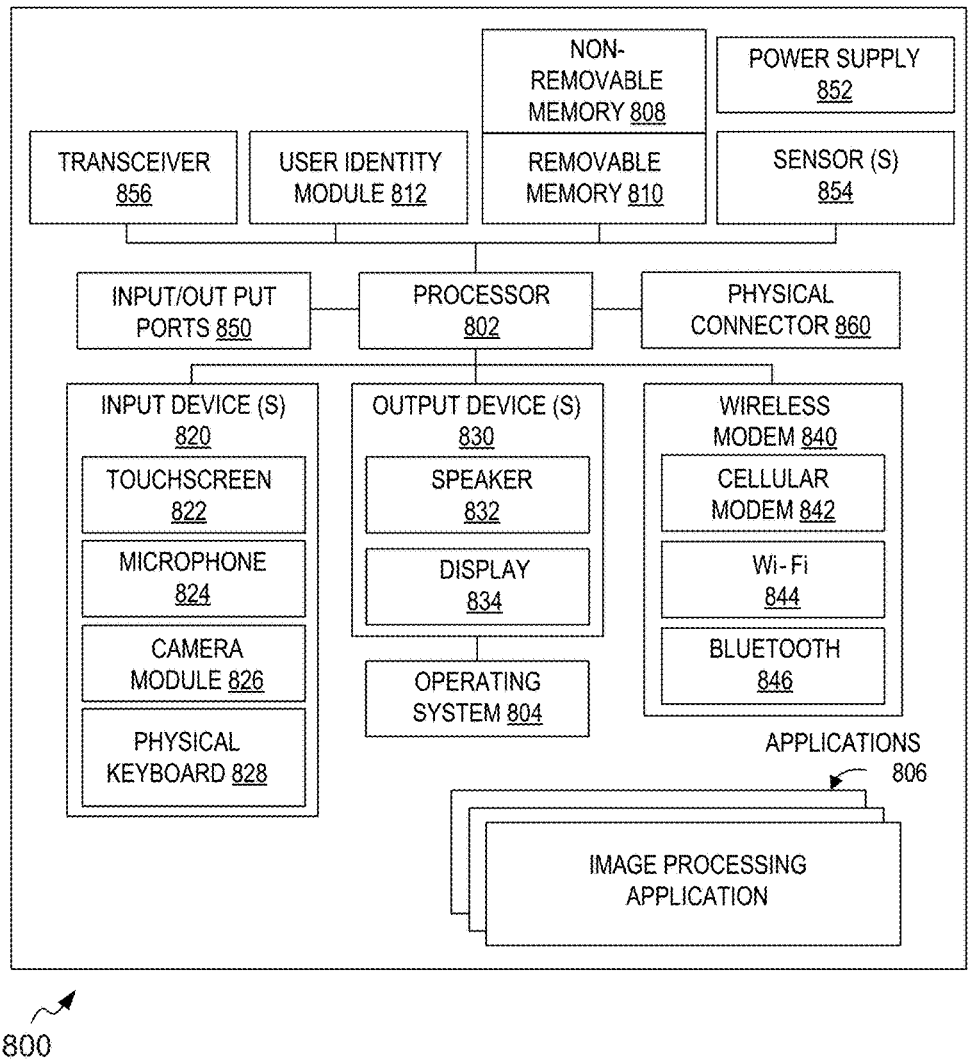
FIG. 8 illustrates an example of a mobile device capable of implementing example embodiments described herein.

Referring now to FIG. 8, a schematic block diagram of a mobile device 800 is shown that is an example of the electronic device 100. The mobile device 800 as illustrated and hereinafter described is merely illustrative of one type of device and should not be taken to limit the scope of the embodiments. As such, it should be appreciated that at least some of the components described below in connection with the mobile device 800 may be optional and thus in an example embodiment may include more, less or different components than those described in connection with the example embodiment of FIG. 8. As such, among other examples, the mobile device 800 could be any of mobile electronic devices, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 800 includes a controller or a processor 802 (e.g., a signal processor, microprocessor, ASIC, or other control and processing logic circuitry) for performing tasks such as signal coding, data processing, image processing, input/output processing, power control, and/or other functions. An operating system 804 controls the allocation and usage of the components of the mobile device 800 and provides support for one or more applications programs (see, access control/image processing application 806) associated with access control of the mobile device 800 or of any application installed on the mobile device 800 that implements one or more of the innovative features described herein. In addition to access control/image processing application, the application programs can include image capturing applications, common mobile computing applications (e.g., telephony applications, email applications, calendars, contact managers, web browsers and messaging applications) or any other computing application.

The illustrated mobile device 800 includes one or more memory components, for example, a non-removable memory 808 and/or removable memory 810. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. Example of data can include web pages, text, images, sound files, image data, video data, or other data sets to be sent to and/or received from one or more network servers or other devices via one or more wired or wireless networks. The mobile device 800 may further include a user identity module (UIM) 812. The UIM 812 may be a memory device having a processor built in. The UIM 812 may include, for example, a SIM, a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA).

The mobile device 800 can support one or more input devices 820 and one or more output devices 830. Examples of the input devices 820 may include, but are not limited to, a touch screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited to a speaker 832 and a display 834. Other possible output devices (not shown) can include piezoelectric or other haptic output devices. Some devices can serve more than one input/output function. For example, the touch screen 822 and the display 834 can be combined into a single input/output device.

In an embodiment, the camera module 826 may include a digital camera capable of forming a digital image file from a captured image. In some implementations, the camera module 826 may include two or more cameras, for example, a front camera and a rear camera positioned on two sides of the mobile device 800 (e.g., in a mobile device). As such, the camera module 826 includes all hardware, such as a lens or other optical component(s), and software for creating a digital image file from a captured image. Alternatively, the camera module 826 may include the hardware needed to view an image, while a memory device of the mobile device 800 stores instructions for execution by the processor 802 in the form of software to create a digital image file from a captured image. In an example embodiment, the camera module 826 may further include a processing element such as a co-processor, which assists the processor 802 in processing image data and an encoder and/or decoder for compressing and/or decompressing image data. In an embodiment, the camera module 826 may provide live image data (or viewfinder image data) to the display 834.

A wireless modem 840 can be coupled to one or more antennas (not shown) and can support two-way communications between the processor 802 and external devices, as is well understood in the art. The wireless modem 840 is shown generically and can include, for example, a cellular modem 842 for communicating at long range with the mobile communication network, a Wi-Fi-compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the mobile device and a public switched telephone network (PSTN).

The mobile device 800 can further include one or more input/output ports 850, a power supply 852, one or more sensors 854 for example, an accelerometer, a gyroscope, a compass, or an infrared proximity sensor for detecting the orientation or motion of the mobile device 800, a transceiver 856 (for wirelessly transmitting analog or digital signals) and/or a physical connector 860, which can be a USB port, IEEE 1394 (FireWire) port, and/or RS-232 port. The illustrated components are not required or all-inclusive, as any of the components shown can be deleted and other components can be added.

With the image processing applications and/or other software or hardware components, the mobile device 800 can implement the technologies described herein. For example, the processor 802 can facilitate capture of images or image frames of a scene through the camera module 826 and perform post-processing of the captured image frames.

Although the mobile device 800 is illustrated in FIG. 8 in form of a smartphone, but more particularly, the techniques and solutions described herein can be implemented with connected devices having other screen capabilities and device form factors, such as a tablet computer, a virtual reality device connected to a mobile or desktop computer, an image sensor attached to a gaming console or television, and the like.

An embodiment of a method comprises:
  obtaining at least two digital image frames, each of the at least two digital image frames captured with a different exposure setting;
  generating, by a processor, a radiance map from the at least two digital image frames;
  performing, by the processor, an image fusion of the at least two digital image frames to generate a fused image; and
  combining, by the processor, color values of image channels of the fused image and the radiance map to generate a high dynamic range (HDR) image frame.

In one embodiment of the method the image channels comprise Red (R), Green (G) and Blue (G) channels.

In one embodiment of the method, alternatively or in addition, generating the radiance map comprises:
  generating histograms corresponding to the image channels of the at least two digital image frames;
  mapping the image channels of the at least two digital image frames using the histograms corresponding to the image channels; and
  determining relative intensities of pixels using the mapped image channels.

In one embodiment the method further comprises, alternatively or in addition, scaling the relative intensities to a global range of intensity to generate the radiance map.

In one embodiment the method further comprises, alternatively or in addition, aligning the at least two digital image frames prior to generating the histograms.

In one embodiment the method further comprises, alternatively or in addition, determining a selection map by selecting a reliable region from among the at least two digital image frames for generating each region of the HDR image frame.

In one embodiment of the method, alternatively or in addition, performing the image fusion comprises:
  assigning binary weights to the at least two digital image frames based on the selection map; and
  combining the at least two digital image frames using the binary weights assigned to the at least two digital image frames.

In one embodiment of the method, alternatively or in addition, combining the color values of the image channels and the radiance map comprises scaling the color values based on corresponding intensity values in the radiance map.

In one embodiment the method further comprises, alternatively or in addition, performing tone mapping of the radiance map prior to combining the color values of the image channels and the radiance map.

An embodiment of an electronic device comprises:
  a memory comprising computer program code for image processing; and
  a processor configured to execute the computer program code to cause the electronic device to at least perform:
    obtain at least two digital image frames, each of the at least two digital image frames captured with a different exposure setting;
    generate a radiance map from the at least two digital image frames;
    perform an image fusion of the at least two digital image frames to generate a fused image; and
    combine color values of image channels of the fused image and the radiance map to generate a high dynamic range (HDR) image frame.

In one embodiment of the electronic device, the image channels comprise Red (R), Green (G) and Blue (G) channels.

In one embodiment of the electronic device, alternatively or in addition, to generate the radiance map the electronic device is further caused at least in part to perform:
  generate histograms corresponding to the image channels of the at least two digital image frames;
  map the image channels of the at least two digital image frames using the histograms corresponding to the image channels; and
  determine relative intensities of pixels using the mapped image channels.

In one embodiment of the electronic device, alternatively or in addition, the electronic device is further caused, at least in part to scale the relative intensities to a global range of intensity to generate the radiance map.

In one embodiment of the electronic device, alternatively or in addition, the electronic device is further caused, at least in part to align the at least two digital image frames prior to generating the histograms.

In one embodiment of the electronic device, alternatively or in addition, the electronic device is further caused, at least in part to determine a selection map by selecting a reliable region from among the at least two digital image frames for generating each region of the HDR image frame.

In one embodiment of the electronic device, alternatively or in addition, to perform the image fusion the electronic device is further caused at least in part to perform:
  assign binary weights to the at least two digital image frames based on the selection map; and
  combine the at least two digital image frames using the binary weights assigned to the at least two digital image frames.

In one embodiment of the electronic device, alternatively or in addition, to combine the color values of the image channels and the radiance map the electronic device is further caused at least in part to perform scaling of the color values based on corresponding intensity values in the radiance map.

In one embodiment of the electronic device, alternatively or in addition, the electronic device is further caused, at least in part to perform tone mapping of the radiance map prior to combining the color values of the image channels and the radiance map.

An embodiment of a computer program product comprises at least one computer-readable storage medium, the computer-readable storage medium comprising a set of instructions, which, when executed by one or more processors, cause an electronic device to at least perform:
  obtaining at least two digital image frames, each of the at least two digital image frames captured with a different exposure setting;
  generating a radiance map from the at least two digital image frames;
  performing image fusion of the at least two digital image frames to generate a fused image; and
  combining color values of image channels of the fused image and the radiance map to generate a high dynamic range (HDR) image frame.

In one embodiment of the computer program product, for generating the image fusion the electronic device is further caused to at least perform:

determining a selection map by selecting a reliable region from among the at least two digital image frames for generating each region of the HDR image frame;

assigning binary weights to the at least two digital image frames based on the selection map; and combining the at least two digital image frames using the binary weights assigned to the at least two digital image frames.

Various example embodiments offer, among other benefits, techniques for improvement in generation of HDR image frames. Various example embodiments use a radiance map and a fused image (containing color information for pixels of an HDR image frame) for generating the HDR image frame. As the fused image is generated from fusing at least two image frames captured at different exposure settings based on weights constructed from a selection map, the fused image comprises a set of individual regions that are locally white balanced. Further, in various example embodiments, the colors of the fused image are further scaled to intensity taken from the radiance map to produce the final colors of the HDR image frame, thereby reducing intensity halos. As the colors are handled locally using the image fusion and the intensity part is directly mapped from the radiance map, the HDR image frame is HDR mixed with local white balances and without intensity halos. Further, usage of the selection map while the image fusion process also precludes formation of artifacts such as ghosting due to moving objects across the at least two image frames of the scene.

Furthermore, various example embodiments may be implemented in a wide variety of devices, network configurations and applications for example, in camera devices, in mobile devices or as part of software imaging applications used in any electronic devices.

Computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the operations of any of the methods described herein when the program is run on a computer and where the computer program may be embodied on a computer readable medium. Examples of tangible storage media include computer storage devices such as disks, thumb drives, memory etc. The software can be suitable for execution on a parallel processor or a serial processor such that the method operations may be carried out in any suitable order, or simultaneously.

Alternatively, or in addition, the functionality described herein (such as the image processing instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

The embodiments illustrated and described herein as well as embodiments not specifically described herein but within the scope of aspects of the invention constitute exemplary apparatus means for generating an HDR image frame from at least two digital image frames. For example, the elements illustrated and described with reference to FIGS. 1 and 8, when configured, under control of the processor 102 and program code in the memory 104 to perform the operations illustrated and described with reference to FIGS. 1 to 7, constitute an exemplary image processing application means for obtaining at least two digital image frames, each of the at least two digital image frames captured with a different exposure setting, for generating a radiance map from the at least two digital image frames, for performing image fusion of the at least two digital image frames to generate a fused image, and for combining color values of image channels of the fused image and the radiance map to generate the HDR image frame.

The benefits and advantages described above may relate to one embodiment or may relate to several embodiments. The embodiments are not limited to those that solve any or all of the stated problems or those that have any or all of the stated benefits and advantages.

The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method, comprising:
   obtaining at least two digital image frames, each of the at least two digital image frames captured with a different exposure setting;
   generating, by a processor, a radiance map from the at least two digital image frames by selecting a reliable region from among the at least two digital image frames for generating each region of a high dynamic range (HDR) image frame and using pixels within an intensity threshold from the selected reliable region to map similar intensities of the pixels between the at least two digital image frames, the radiance map generated from pixel intensities mapped to a global pixel intensity range to correspond to intensities for pixels of the HDR image frame to be generated;
   performing, by the processor, an image fusion of the at least two digital image frames to generate a fused image; and
   combining, by the processor, color values of image channels of the fused image and the radiance map to generate the HDR image frame, the combining including scaling the color values of the fused image to the pixel intensities in the radiance map.

2. The method of claim 1, wherein the image channels comprise Red (R), Green (G) and Blue (G) channels.

3. The method of claim 1, wherein generating the radiance map comprises:
   generating histograms corresponding to the image channels of the at least two digital image frames;
   mapping the image channels of the at least two digital image frames using the histograms corresponding to the image channels; and
   determining relative intensities of pixels using the mapped image channels.

4. The method of claim 1, further comprising
   generating a color map directly from image data for the at least two digital image frames, the color map having non-globally mapped intensities, the color values of the image channels of the fused image based at least in part on the color map.

5. The method of claim 1, further comprising
   aligning the at least two digital image frames prior to generating the histograms.

6. The method of claim 1, further comprising
   determining a selection map by selecting the reliable region from among the at least two digital image frames for generating each region of the HDR image frame.

7. The method of claim 6, wherein performing the image fusion comprises:
   assigning binary weights to the at least two digital image frames based on the selection map; and
   combining the at least two digital image frames using the binary weights assigned to the at least two digital image frames.

8. The method of claim 1, further comprising
   using a ghostmap for generating the HDR image frame, the ghostmap including a probability of a presence of a moving object at an image pixel.

9. The method of claim 1, further comprising performing tone mapping of the radiance map prior to combining the color values of the image channels and the radiance map.

10. An electronic device, comprising:
    a memory comprising computer program code for image processing; and
    a processor configured to execute the computer program code to cause the electronic device to at least perform:
       obtain at least two digital image frames, each of the at least two digital image frames captured with a different exposure setting;
       generate a radiance map from the at least two digital image frames by selecting a reliable region from among the at least two digital image frames for generating each region of a high dynamic range (HDR) image frame and using pixels within an intensity threshold from the selected reliable region to map similar intensities of the pixels between the at least two digital image frames, the radiance map generated from pixel intensities mapped to a global pixel intensity range to correspond to intensities for pixels of the HDR image frame to be generated;
       perform an image fusion of the at least two digital image frames to generate a fused image; and
       combine color values of image channels of the fused image and the radiance map to generate the HDR image frame, the combining including scaling the color values of the fused image to the pixel intensities in the radiance map.

11. The electronic device of claim 10, wherein the image channels comprise Red (R), Green (G) and Blue (G) channels.

12. The electronic device of claim 10, wherein to generate the radiance map the electronic device is further caused at least in part to perform:
    generate histograms corresponding to the image channels of the at least two digital image frames;
    map the image channels of the at least two digital image frames using the histograms corresponding to the image channels; and
    determine relative intensities of pixels using the mapped image channels.

13. The electronic device of claim 12, further caused, at least in part to
    generate a color map directly from image data for the at least two digital image frames, the color map having non-globally mapped intensities, the color values of the image channels of the fused image based at least in part on the color map.

14. The electronic device of claim 12, further caused, at least in part to align the at least two digital image frames prior to generating the histograms.

15. The electronic device of claim 10, further caused, at least in part to determine a selection map by selecting the reliable region from among the at least two digital image frames for generating each region of the HDR image frame.

16. The electronic device of claim 15, wherein to perform the image fusion the electronic device is further caused at least in part to perform:
    assign binary weights to the at least two digital image frames based on the selection map; and
    combine the at least two digital image frames using the binary weights assigned to the at least two digital image frames.

17. The electronic device of claim 10, wherein to combine the color values of the image channels and the radiance map the electronic device is further caused at least in part to perform using a ghostmap for generating the HDR image frame, the ghostmap including a probability of a presence of a moving object at an image pixel.

18. The electronic device of claim 10, further caused, at least in part to perform tone mapping of the radiance map prior to combining the color values of the image channels and the radiance map.

19. A computer program product comprising at least one computer-readable storage medium, the computer-readable storage medium comprising a set of instructions, which, when executed by one or more processors, cause an electronic device to at least perform:

obtaining at least two digital image frames, each of the at least two digital image frames captured with a different exposure setting;

generating a radiance map from the at least two digital image frames by selecting a reliable region from among the at least two digital image frames for generating each region of a high dynamic range (HDR) image frame and using pixels within an intensity threshold from the selected reliable region to map similar intensities of the pixels between the at least two digital image frames, the radiance map generated from pixel intensities mapped to a global pixel intensity range to correspond to intensities for pixels of the HDR image frame to be generated;

performing image fusion of the at least two digital image frames to generate a fused image; and combining color values of image channels of the fused image and the radiance map to generate the HDR image frame, the combining including scaling the color values of the fused image to the pixel intensities in the radiance map.

20. The computer program product of claim 19, wherein for generating the image fusion the electronic device is further caused to at least perform:

determining a selection map by selecting the reliable region from among the at least two digital image frames for generating each region of the HDR image frame;

assigning binary weights to the at least two digital image frames based on the selection map; and combining the at least two digital image frames using the binary weights assigned to the at least two digital image frames.

* * * * *